Patented Mar. 1, 1938

2,109,490

UNITED STATES PATENT OFFICE 2,109,490

LUBRICANT

David Lipkin, Philadelphia, Pa., assignor to The Atlantic Refining Company, Philadelphia, Pa., a corporation of Pennsylvania No Drawing. Application April 6, 1935,
Serial No. 15,097

9 Claims. (Cl. 87—9)

The present invention relates to the art of lubrication, and more particularly to the lubrication of surfaces engaging under extreme pressure, as for example, the rubbing surfaces of hypoid gears, free wheeling transmissions, speed reducers and the like.

The general tendency in the design of modern machinery has been toward a higher ratio between power and "dead weight". This is especially true in the automotive industry, and in recent years certain types of gears and other mechanisms have been developed with the operating pressures on the working surfaces so high that ordinary mineral oil lubricants will not provide sufficient lubrication for satisfactory operation.

Heretofore it has been thought that lubrication consists in maintaining a film of oil between the rubbing surfaces, thereby preventing them from coming into contact with one another and thus preventing wear. That this condition exists in well lubricated bearings is well known, but this conception of lubrication does not apply to highly loaded gears. In well lubricated bearings the loads rarely exceed 2000 lbs. per sq. in. projected area and the rubbing speeds are generally high enough to maintain a film of oil which separates the rubbing surfaces. In automobile gears, the pressures between gear teeth reach very high values and even the most viscous oils or greases cannot be retained between the surfaces of the teeth in a sufficiently thick film to prevent metal to metal contact, particularly when operating temperatures of 210° F. or higher are commonly encountered.

It has been known that compounded lubricants such as, for example, mineral oils containing fatty oils, fatty acids, metallic soaps, sulfur or combined chlorine, possess lubricating qualities which render them suitable for use under high operating pressures. These compounded oils function satisfactorily under conditions which would cause failure of an unblended mineral oil, if used alone. It is believed that the successful use of such compounded oils depends upon the adsorption and reaction or union of certain components of these oils with the metal surfaces whereby a film of metallic compound, such as, for example, iron sulfide is formed. It appears that such a film or plating has a low coefficient of friction and that satisfactory operation of heavily loaded bearings or gears depends upon the formation and maintenance of such a film, and not upon the retaining of a film of oil between the bearing surfaces. The hydrocarbon oil constituent of an extreme pressure lubricant serves primarily to remove frictional heat, to wash away any solid particles which may result from wear, and to prevent oxidation of the engaging surfaces.

I have discoverd that compounds containing phosphorus, nitrogen and halogen, and more, particularly the phosphonitrilic chlorides, when admixed with hydrocarbon oils, are of special utility in the field of extreme pressure lubrication. I have further discovered that such compounds, when subjected to heat, form polymers of very high molecular weight, which polymers, when disperserd in hydrocarbon oils, are capable of improving the viscosity-temperature relationship, i. e., the viscosity-index, to a marked degree.

The phosphonitrilic halides, which may be employed in accordance with my invention, are shown in the following table.

| Compound | Melting point | Boiling point | |
|---|---|---|---|
| | | 13 m/m | 760 m/m |
| | °C. | | |
| $(PNCl_2)_3$ | 114 | 127° C. | 256.5° C. |
| $(PNCl_2)_4$ | 123.5 | 188° C. | 328.5° C. |
| $(PNCl_2)_5$ | 41 | 224° C. | Polymerizes. |
| $(PNCl_2)_6$ | 90 | 262° C. | Do. |
| $(PNCl_2)_7$ | Below −18 | 291° C. | Do. |
| $(PNCl_2)_n$ | Below 500 | Depolymerizes on distillation. | |

These compounds are soluble in the common organic solvents and hydrocarbon oils, and may be steam-distilled, or boiled with acids or alkalis, without substantial decomposition. Upon heating to temperatures of the order of 250° C. to 350° C., each member of the series polymerizes to form high molecular weight, elastic, rubber-like compounds which may be dispersed in hydrocarbon oil to improve the same, particularly with respect to viscosity-index. At temperatures in excess of about 350° C. depolymerization of the high molecular weight compounds occurs, with the formation of the lower molecular weight halides. If desired, the high molecular weight polymers may be formed in the oil directly, for example, by adding the lower molecular weight halides thereto and thereafter heating the mixture or solution to temperatures of the order of 250° C. to 350° C., preferably under such conditions that oxidation of the oil is prevented.

In preparing my lubricant, I add to a suitable mineral oil one or a mixture of two or more of the phosphonitrilic halides in quantity sufficient to improve the lubricating value of the oil to any desired extent, depending upon the operating conditions under which the lubricant is to be used. I have found that the quantity of halide required, in general, does not exceed substantially 10% by weight of my composition. Quantities of halide as small as 3%, or even 1% or less, in certain instances, have been found to improve lubricating oils to a satisfactory extent. In preparing my lubricant, I may obtain a homogeneous solution of halide in mineral oil by agitating the mixture at normal or elevated temperatures, or I may dissolve the halide in a suitable solvent and add the resulting solution to the oil, thereafter removing the solvent by vaporization.

A typical example of my improved lubricant and method of preparing the same is as follows:

Phosphorus pentachloride and ammonium chloride, in the proportion of 1.84 moles of the former to 2.19 moles of the latter, were diluted with a quantity of symmetrical tetrachloroethane. The resulting mixture was refluxed at a temperature within the range of about 120° C. to 146° C. until hydrochloric acid gas was no longer given off. The mixture was cooled, and filtered to remove excess ammonium chloride, and the solvent, i. e., tetrachloroethane was removed by distillation under reduced pressure. Upon removal of the solvent and subsequent cooling, a portion of the lower molecular weight halides, $(PNCl_2)_3$ and $(PNCl_2)_4$, crystallized from the remaining higher molecular weight halides and was filtered therefrom. The filtrate of the higher molecular weight compounds containing a small quantity of $(PNCl_2)_3$ and $(PNCl_2)_4$ was distilled under reduced pressure to recover therefrom the latter compounds. The higher molecular weight compounds comprising the residue from the distillation may be admixed or dispersed in hydrocarbon oil to improve the load-bearing capacity and/or the viscosity-index thereof. The mixture of the lower halides $(PNCl_2)_3$ and $(PNCl_2)_4$ was recrystallized from benzene and the purified product, about 1% by weight, was dissolved in a lubricating oil having a Saybolt universal viscosity of 265 seconds at 100° F., and an A. P. I. gravity of 24.5°. Upon testing this lubricant in an Almen extreme pressure lubricant testing machine at 600 R. P. M., a pressure of 13,000 lbs./sq. in. projected bearing area was required before seizure of the bearing occurred, whereas the unblended lubricating oil failed at a pressure of 4,000 lbs./sq. in.

While, hereinabove, I have shown the preparation of phosphonitrilic halides by the reaction of phosphorus pentachloride with ammonium chloride in a diluent or solvent medium such as tetrachloroethane, I do not intend to be limited thereto, but may employ the various phosphorus penta-halides, for example, chlorides or bromides, with ammonium chloride or ammonia, in the presence or absence of suitable solvents. Furthermore, the phosphonitrilic halides may be separated from the reaction products or from one another by fractional crystallization or fractional distillation, preferably under reduced pressure, or by a suitable combination of such methods.

It will be seen, from the above example, that the addition of phosphonitrilic halides to a mineral oil improves the lubricating value of such an oil to a marked extent, and imparts to the oil certain properties which render it suitable for use in the lubrication of surfaces engaging under extreme pressure. Moreover, the addition of the higher molecular weight polymers formed by heat treatment of the halides, to lubricating oils substantially improves the viscosity-index of such oils.

While I have described my invention with reference to the lubrication of gears and bearings operating under heavy loads, I do not intend to limit myself thereto, but contemplate the use of my lubricant in operations such as the cutting and boring of metals, in which conditions of extreme pressure and temperature are normally encountered, and also in the lubrication of mechanisms operating under moderate pressures, as for example, the crankcase bearings and cylinder walls of internal combustion engines. Furthermore, my compounded oil may be utilized as a base in the preparation of thickened oils, i. e., greases, by the addition thereto of soaps or other conventional thickening agents, whereby to obtain lubricants of desired viscosity. My compounded oil may also be blended with fatty oil, or the halides alone may be admixed with fatty oils, for the lubrication of mechanisms in which the presence of a fatty oil is desirable.

What I claim is:

1. A lubricant comprising a hydrocarbon oil and a phosphonitrilic halide.

2. A lubricant comprising a hydrocarbon oil and less than substantially 10% of a phosphonitrilic halide.

3. A lubricant comprising a hydrocarbon oil and less than substantially 3% of a phosphonitrilic halide.

4. A lubricant comprising a hydrocarbon oil and less than substantially 1% of a phosphonitrilic halide.

5. A lubricant comprising a hydrocarbon oil and less than substantially 1% of a phosphonitrilic chloride.

6. A lubricant comprising a hydrocarbon oil and a phosphonitrilic chloride of the formula $(PNCl_2)_n$ in which subscript "$n$" is from 3 to 7.

7. A lubricant comprising a hydrocarbon oil and a high molecular weight polymer of the formula $(PNCl_2)_n$, in which subscript "$n$" is not less than 7.

8. A method of increasing the load-bearing capacity of a lubricating oil which comprises blending with said oil a small quantity of a phosphonitrilic halide.

9. A method of increasing the load-bearing capacity of an oil for lubricating surfaces engaging under pressure which comprises blending with said oil a small quantity of a phosphonitrilic chloride.

DAVID LIPKIN.